United States Patent [19]

Kuo

[11] Patent Number: 5,118,262
[45] Date of Patent: Jun. 2, 1992

[54] MULTI-FUNCTION COMBINATION AIR COMPRESSOR

[76] Inventor: Shui-Long Kuo, No. 171-47, Cheng Kung Tsun, Jen Te Hsiang, Tainan, Hsien, Taiwan

[21] Appl. No.: 678,722

[22] Filed: Apr. 1, 1991

[51] Int. Cl.⁵ .......................... F04B 35/00; F16M 1/00
[52] U.S. Cl. ...................................... 417/363; 248/638
[58] Field of Search ...................... 417/311, 312, 363; 248/581, 601, 612, 624, 638

[56] References Cited

U.S. PATENT DOCUMENTS

| | | | |
|---|---|---|---|
| 1,979,892 | 11/1934 | Loeffler | 248/581 |
| 4,496,130 | 1/1985 | Toyama | 248/638 |
| 4,729,722 | 3/1988 | Toth | 417/312 |
| 4,844,701 | 7/1989 | Wolford et al. | 417/312 |
| 4,891,955 | 1/1990 | Klausing et al. | 417/363 |

*Primary Examiner*—Richard A. Bertsch
*Assistant Examiner*—Alfred Basichas

[57] ABSTRACT

A multi-function combinational air compressor comprising an engine for compressing air, a motor to drive the engine, a filter cylinder to filter oil and miscellaneous matter out of the compressed air produced by the engine, a coiled double-layer cooling tube having a small inner tube and a large outer tube for the cold medium and the compressed air to separately circulate, an air and water separator to separate the compressed air from the water, a radiator to cool down the compressed air coming from the air and water separator and send it out in a compressed air tank, a sealed housing case to house all the other components having all its inside wall covered with a cotton layer to muffle the noise produced, and a base plate supported by four springs to mount on the engine and the motor for absorbing the vibration and noise caused by them.

1 Claim, 4 Drawing Sheets

MULTI-FUNCTION COMBINATION AIR COMPRESSOR

BACKGROUND OF THE INVENTION

Common conventional air compressors may give out noise as large as 70 decibles when they operate. Such large noise is detrimental to workers, especially so in a closed work shop. Those conventional compressors are really disadvantageous to be used in assembly lines in factories, where pneumatic tools are widely used.

In addition, the compressed air coming out of conventional air compressors often has high temperature and high moisture. If worse, it may contain oil or miscellaneous impurities to cause machines to become rusted, to break down or to get out of order, not satisfying the standard of dry air for industries.

Some conventional air compressors contained in a sealed case may have a good outlook and prevent noise from spreading out, but engines may become very hot as to cause the lubricating oil used in them to evoparate, and thus the lubricating oil has to be refilled very often. Otherwise, the engines may go to stop dead, which makes up a rather large loss.

SUMMARY OF THE INVENTION

In view of the disadvantages of conventional air compressors, this invention has been devised to supply a multi-function combinational air compressor having the following purposes.

1. One purpose is to have low noise and compact dimensions.
2. Another purpose is to produce dry compressed air having almost no impurities and medium temperature, not to cold or too warm.

One feature this invention has is four shock-absorbing springs accomodated under a base plate, on which an engine and a motor to drive the engine of this air compressor are mounted, and thus the vibration and the noise produced by them can be reduced to the least.

Another feature this invention has is that the rather cool air in the sealed housing case of this air compressor is to be sucked into the engine to cool down the temperature of the engine.

One more feature this invention has is that a sealed housing case is provided to house therein all the components of this air compressor and all the inside wall surfaces of the housing case are covered with a layer of cotton to muffle the noise produced by this air compressor to the least.

DETAILED DESCRIPTION OF THE INVENTION

Figure 1:
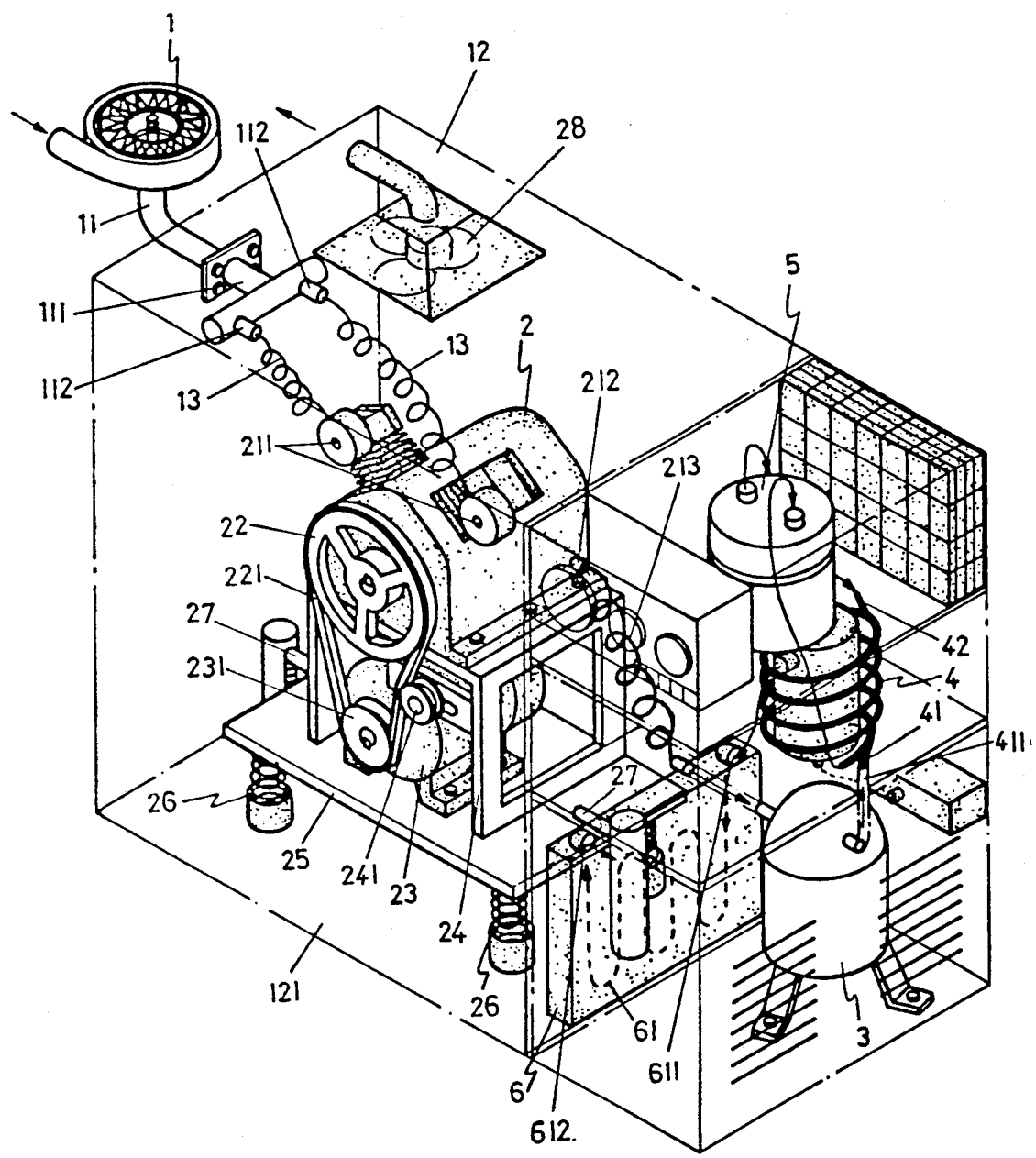
FIG. 1 is an inside perspective view of the multi-function combinational air compressor in the present invention.
Figure 2:
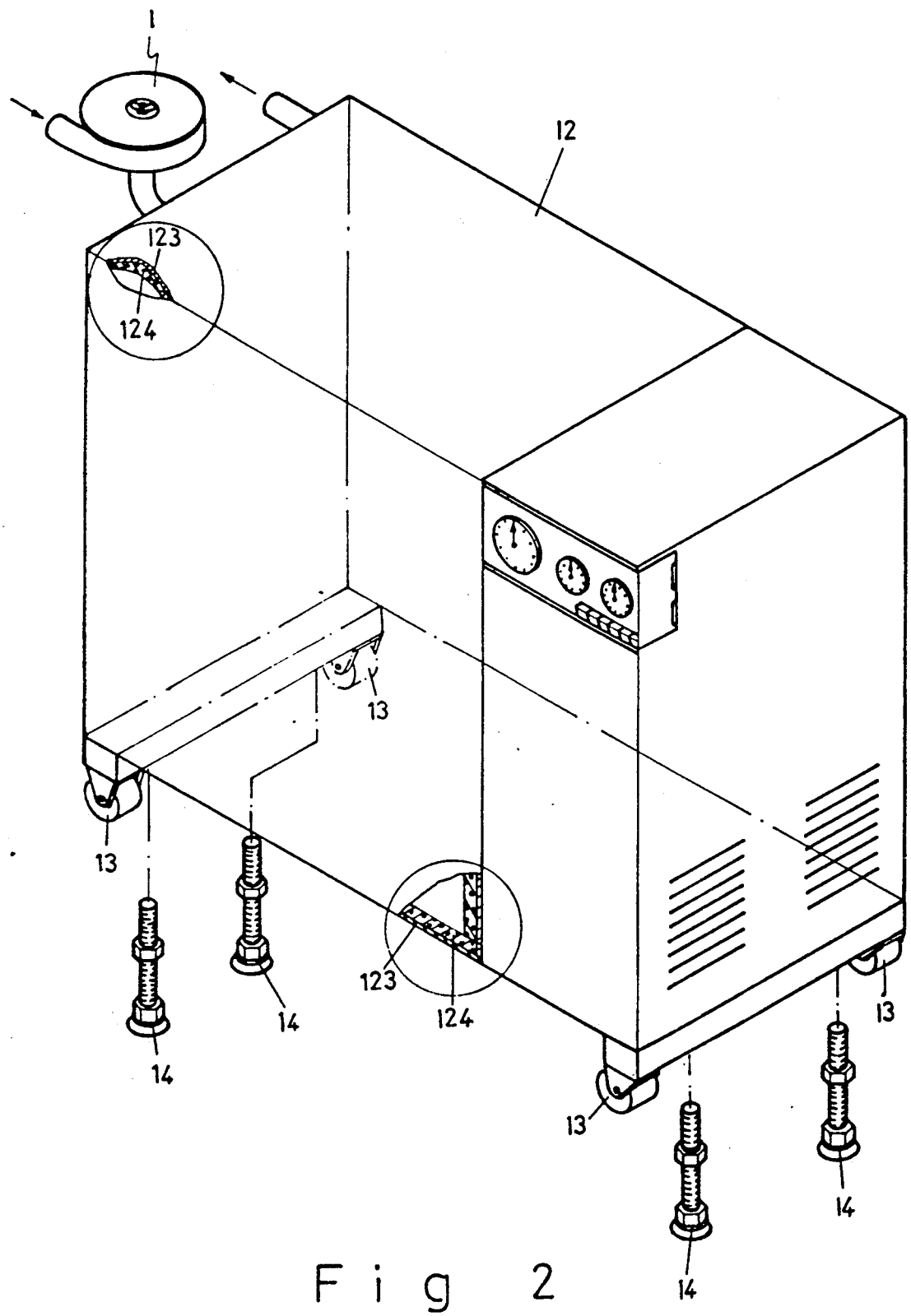
FIG. 2 is an outside perspective view of the multi-function combinational air compressor in the present invention.

The multi-function combinational air compressor in the present invention comprises an air purifier 1, an engine 2, a motor 23 to drive the engine 2, a filter cylinder 3, a set of double-layer cooling tube 4, an air and water separator 43, a refrigerting dryer 5, and a radiator 6 as the main components.

The air purifier 1 is accomodated at the outside of a sealed housing case 12, connected with one end of a conduit 11 extending into the sealed housing case 12, and having the other end connected with a T-shaped tube 111 having two exits 112 connected with two inlets 211 of the engine 2 by means of two soft high-pressure tube 13 to prevent the vibration of the engine 2 from transmitting to the case wall.

The engine 2 has a belt wheel 22 to be rotated by a belt 221 pulled around by a belt wheel 231 driven by the motor 23 positioned under the engine 2. A belt wheel 241 is additionally provided beside the middle of the two belt wheels 22, 231 on an engine stand 24 for adjusting properly the tightness of the belt 221.

A rectangular base plate 25 is provided directly supporting the motor 23 and an engine stand 24 supporting the engine 2 and four shock-absorbing springs 26 are respectively fixed under the four corners of the plate 25. Each spring 26 has its upper end sustaining the plate 25 and its lower end standing on the bottom of a spring support cylinder 262 fixed on the bottom wall of the housing case 12 such that the four shock-absorbing springs 26 can sustain the base plate 25 and thus the engine 2 and the motor 23 are not directly kept in contact with the case 12 to attain shock-absorbing effect and to reduce their operating noise and vibration.

Figure 3:
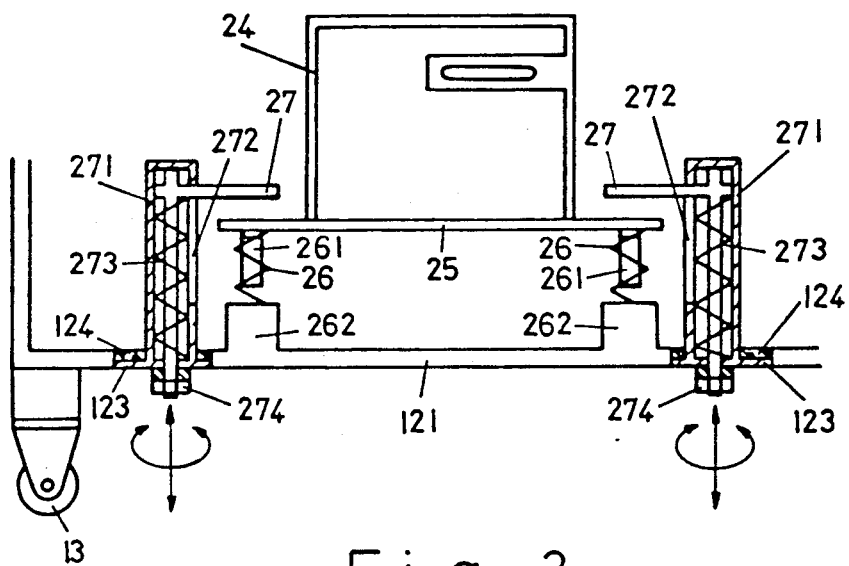
FIG. 3 is a part cross-sectional view of the multi-function combinational air compressor in the present invention.
Figure 4:
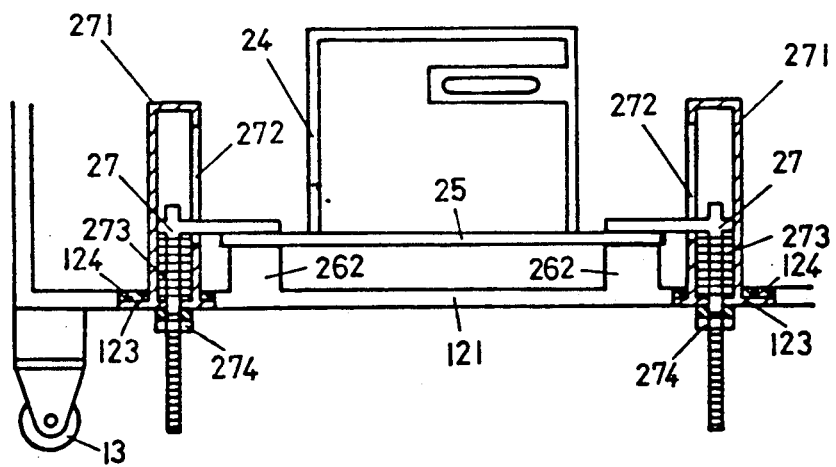
FIG. 4 is another cross-sectional view of the multi-function combinational air compressor in the present invention.

Two opposite L-shaped fixing bolts 27 for transporting or moving this air compressor are provided at two opposite sides of the base plate 25, as shown in FIGS. 3, 4, having their horizontal sections extend above the base plate 25 and their straight vertical sections fit in long narrow hollows 272 in a bolt housings 271 and pass through coiled springs 273, which lift up the L-shaped fixing bolt to separate from the base plate 25 when this air compressor works. But for moving or transporting, nuts 274 at the bottom end of the bolts 27 can be screwed tightly upward to lower down the bolts 27 until the horizontal sections compress the base plate 25 immovable.

Figure 5:
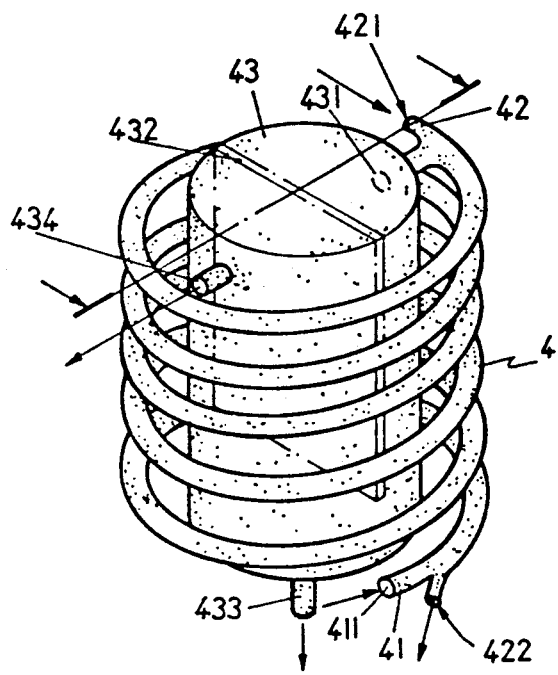
FIG. 5 is a perspective view of the double-layer cooling tube in the present invention.
Figure 6:
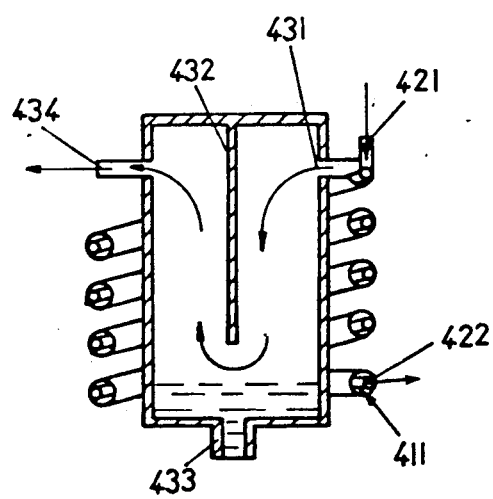
FIG. 6 is a cross-sectional view of the double-layer cooling tube in the present invention.

The filter cylinder 3 is provided to filter oil and miscellaneous material from the compressed air coming out of an exit 212 of the engine 2 through a soft high-pressure tube 213 connected between them. The oil and miscellaneous material accumulated therein can be automatically exhausted out when their amount reaches a certain pre-set volume. The air filtered in the filter cylinder 3 is then led into an outer tube 41 of a double-layer cooling tube 4, through a lower inlet 411 leading the air to an inlet 431 of an air and water separator 43, as shown in FIGS. 5, 6.

The inner tube 42 of the double-layer cooling tube 4 has an upper inlet 421 connected with a cold medium tube of a refrigering dryer 5 such that the cold medium can pass through the upper inlet 421 of the inner tube 42 circulating downward and the air can pass through the lower inlet 411 of the outer tube 41 circulating upward to flow through the inlet 431 into the air and water separator 43, and thus the cold medium and the hot air can exchange their temperature, permitting the moisture in the air to be cooled to become tiny water drops. After the air mixed with water drops enters the air and water separator 43, the tiny water drops may be intercepted by a separating vertical wall 432 extending down from the middle of the top wall of the air and water separator 43, but not reaching the bottom of the separator 43. Then the water drops gradually flow down along the wall 432 to the bottom provided with an exhaust tube 433, through which the water can flow out. On the other hand, the cooled air coming in the separator 43 flows past the opening under the lower end of the wall 432 and up to an exit 434 connected with an inlet 611 of a circulating tube 61 in the radiator 6 as shown in FIG. 1. Then the air flowing through the inlet 611 in the radiator 6 can be somewhat cooled during passing through the circulating tube 61 and flow out of an exit 612 into a compressed air tank.

A blower 28 is additionally provided at an upper corner for sucking the air in the sealed housing case 12 to send back in the engine 2 to cool it.

In order to reduce to the least the noise coming from the motor 23 and the engine 2, a sealed housing case 12 containing all the other components is provided, having all its inside wall surfaces 123 covered with a layer of noise-absorbing cotton 124 so as to muffle the noise produced to the least.

What is claimed is:

1. A multi-function combinational air compressor comprising:

an sealed housing case housing all the other components of this air compressor;

an air filter provided at the outside of the sealed housing case, to be connected with a conduit connected with an end of a T tube having the other two ends connected with the two inlets of an engine by means of two soft high-pressure tubes;

an engine driven by a motor to compress the air coming from the air filter through the two soft high-pressure tubes and having an exit connected with an inlet of a filter cylinder;

a rectangular base plate for accomodating the engine and the motor thereon, having four shock-absorbing coiled springs under the four corners and four spring posts extending down for the springs to fit around and move up and down, four spring support cylinders provided on the bottom of the sealed housing case in the corresponding location to the four springs to support them such that the four shock-absorbing springs can absorb the vibration of the motor and the engine and reduce their noise to be transmitted to the housing case;

two L-shaped fixing bolts having their vertical threaded portions fitting and possible to move up and down in narrow long hollows in bolt housings fixed vertical on the bottom of the housing case near two opposite sides of the base plate and horizontal portions extending toward and above the base plate, a coiled spring provided in each bolt housing fitting around the vertical threaded portion, a nut provided under the bottom of the housing case to screw with the vertical threaded portion, said nuts possible to screw down the vertical threaded portions permitting the horizontal portions to compress the opposite side surfaces of the base plate such that the engine and the motor can be prevented from vibration in moving or transporting this air compressor;

a filter cylinder to receive the compressed air coming out of the engine and to filter off oil and miscellaneous matter in the air;

a coiled double-layer cooling tube having a large outer tube to receive the air coming out of the filter cylinder and a small inner tube to receive a cold medium from the medium tube in a refrigating dryer;

an air and water separator provided to receive the air coming out of the double-layer cooling tube to seperate the tiny water drops mixed in the air coming therein, the tiny water drops intercepted by and to flow down a vertical separating wall and to be exhausted out of an exhaust tube at the bottom, the air separated from the water being led into a radiator;

a radiator provided to receive the air coming from the air and water separator and to cool the air and then to send it to a compressed air tank;

a blower provided in an upper corner in the sealed housing case to suck the cool air therein into the engine for cooling it; and the sealed housing case having all its inside wall surfaces covered with a layer of cotton to muffle the noise and the vibra-vibration produced by the motor and the engine.

* * * * *